(12) United States Patent
Magne et al.

(10) Patent No.: US 7,703,331 B2
(45) Date of Patent: Apr. 27, 2010

(54) INSTRUMENTED TABULAR DEVICE FOR TRANSPORTING A PRESSURIZED FLUID

(75) Inventors: Sylvain Magne, Chatillon (FR); Pierre Ferdinand, Houilles (FR); Pierre-Jean Daniel, Bièvres (FR)

(73) Assignee: Commissariat A l'Energie Atomique, Paris (FR)

( * ) Notice: Subject to any disclaimer, the term of this patent is extended or adjusted under 35 U.S.C. 154(b) by 659 days.

(21) Appl. No.: 10/582,835

(22) PCT Filed: Dec. 20, 2004

(86) PCT No.: PCT/FR2004/050736

§ 371 (c)(1),
(2), (4) Date: May 7, 2007

(87) PCT Pub. No.: WO2005/064300

PCT Pub. Date: Jul. 14, 2005

(65) Prior Publication Data

US 2007/0284112 A1    Dec. 13, 2007

(30) Foreign Application Priority Data

Dec. 22, 2003    (FR) .................................. 03 51168

(51) Int. Cl.
*G01L 1/24* (2006.01)
(52) U.S. Cl. .......................................... 73/800; 73/766
(58) Field of Classification Search ........... 73/760–766, 73/800
See application file for complete search history.

(56) References Cited

U.S. PATENT DOCUMENTS 5,218,197 A    6/1993    Carroll
5,364,389 A *  11/1994   Anderson ...................... 606/8
5,726,744 A    3/1998    Ferdinand et al.

(Continued)

FOREIGN PATENT DOCUMENTS

EP    0 892 250 A1    1/1999

(Continued)

OTHER PUBLICATIONS

Tennyson, R. C., Smart Structures and Materials, "Intelligent Pipeline Using Fiber Optic Sensors", 2003, pp. 295-304.

(Continued)

*Primary Examiner*—Max Noori
(74) *Attorney, Agent, or Firm*—Nixon Peabody LLP (57) ABSTRACT

The invention relates to an instrumented tubular device for transporting a pressurized fluid notably in the field of oil exploration and in that of the transport of gas or hydrocarbons. This device comprises a tube in which this fluid flows, with which are associated means for measuring the main deformations of this tube, and means for measuring the temperature of the fluid in the tube. This tube is equipped with measurement means integral with its surface and offset by at least one remote optical cable towards an electronic measurement system. These measurement means are means for assembling at least two non-parallel optical fibers which comprise at least three assemblies of at least two optical gages with Bragg gratings attached to at least three measurement locations and connected to the remote optical cable via optical fibers. At least one assembly further comprises a temperature gage.

27 Claims, 4 Drawing Sheets

U.S. PATENT DOCUMENTS

| | | |
|---|---|---|
| 6,450,037 B1 | 9/2002 | McGuinn et al. |
| 6,536,291 B1 | 3/2003 | Gysling et al. |
| 6,550,342 B2 * | 4/2003 | Croteau et al. ............ 73/800 |
| 6,586,722 B1 | 7/2003 | Kenny et al. |
| 6,644,848 B1 | 11/2003 | Clayton et al. |
| 6,820,489 B2 * | 11/2004 | Fernald et al. ............ 73/705 |
| 6,874,361 B1 * | 4/2005 | Meltz et al. ............ 73/152.32 |
| 7,315,666 B2 * | 1/2008 | Van Der Spek ............ 385/12 |
| 7,561,771 B2 * | 7/2009 | Jaaskelainen et al. ....... 385/100 |

FOREIGN PATENT DOCUMENTS

| | | |
|---|---|---|
| EP | 1 296 117 A1 | 3/2003 |
| WO | 03/076887 A1 | 9/2003 |

OTHER PUBLICATIONS

Andersen, Martin, OTC 13201 "Development of an Optical Monitoring System for Flexible Risers", Apr. 30, 2001, 7 pp.

* cited by examiner

INSTRUMENTED TABULAR DEVICE FOR TRANSPORTING A PRESSURIZED FLUID

Cross-Reference to Related Application

This application claims priority based on International Patent Application No. PCT/FR2004/050736 filed on Dec. 20, 2004, entitled "Instrumented Tubular Device for Transporting a Pressurized Fluid" by Sylvain Magne, Pierre Ferdinand, Pierre-Jean Daniel, which claims priority of French Application No. 03 51168, filed on Dec. 22, 2003, and this application was not published in English.

TECHNICAL FIELD

The present invention relates to an instrumented tubular device for transferring a pressurized fluid, notably in the field of oil exploration, and in that for the transport of gas or hydrocarbons.

STATE OF THE PRIOR ART

In the field of oil exploration, deposits tend to become scarce. Exploitation of new deposits is carried out more and more frequently offshore, or even in the high seas and at great depths (deep offshore). In this context, real-time assistance to production services of offshore and deep offshore oil fields is a new need and specific to developments consecutive to such exploitation.

With the objective of reducing bulkiness and costs, the tubes used operate close to their design limits. Cumulated stresses and fatigue are therefore significant.

Figure 1:
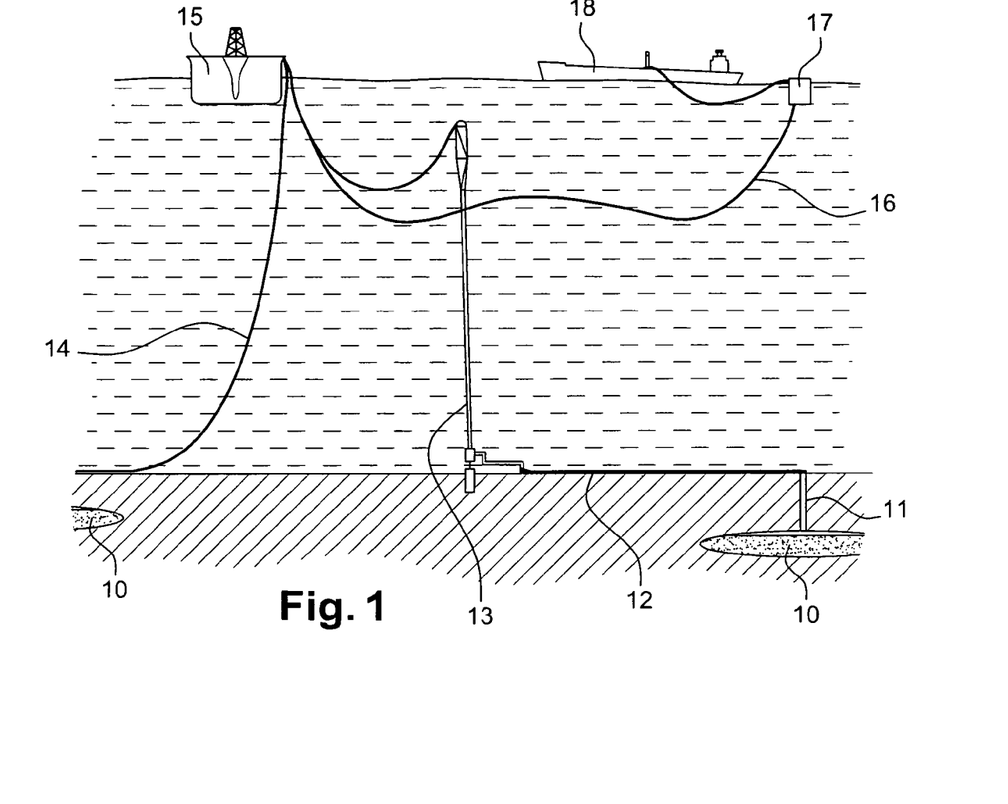
FIG. 1 illustrates a typical diagram of a submarine oil exploitation facility.

As illustrated in FIG. 1, the hydrocarbon fluid under pressure (typically 70 bars or more) and subject to a high temperature (typically 100° C. or more) is extracted from one or more reservoirs 10 by drilling (well 11) and then conveyed via flow lines 12 to risers (tower riser 13, catenary riser 14) so as to be brought up to the surface. This fluid is then pre-treated in a collecting station 15 before being sent back via an export line 16 to a loading base 17 for a tanker 18.

During exploitation at great depths, the fluid pressures are less than the external pressure exerted by water on the tube.

The high cost of such installations, as well as that of their operation and maintenance, urges oil operators to anticipate their modes of degradation and the causes of oil fluid supply failures with the purpose of guaranteeing operational condition of the whole production line.

In particular, the oil operators should anticipate the formation of hydrate plugs which may appear under very specific thermodynamic conditions, depending on the temperature and the internal pressure of the fluid. Such plugs, when they are formed, may lead to conduit blocking and result in significant costs. It is therefore necessary to monitor the internal pressure and the temperature of the fluid in order to prevent the occurrence of such plugs.

Moreover, the instrumentation need is not only expressed through maintaining the vein fluid, by thereby monitoring the temperature in critical points distributed along the flow, but also as regards tracking the stresses (monitoring fatigue) and optimizing the production rate. Such an obligation requires detection of any sudden change in pressure.

The displacement velocity of a hydrate plug may be estimated by measuring the time taken by a corresponding overpressure front for propagating from one measurement point to another located nearby (for example a few meters further on).

The tubes used for making the conduits have a typical diameter of 12 inches (about 30 cm) and a wall thickness of ¾ of an inch (about 19 mm). They form sections with a length from 12 m to 48 m. These tubes are thermally insulated in order to maximally reduce heat losses by conduction with the outside (water at about 4° C.) and to thereby maintain the fluid at a sufficiently high temperature in order to prevent the formation of hydrate plugs.

The oil operators are therefore motivated by any development of novel instrumentation with increased reliability, easy to apply, which has an optimized cost, so that they may monitor the main phenomena occurring in the ocean deeps and therefore, in fine, optimize their production means and their productivity.

The problem which the invention proposes to solve therefore relates to the development of a complete system for measuring temperature, pressure and internal pressure changes of the fluid flowing inside a transport conduit as well as monitoring it as regards fatigue (traction and flexure) in a remote offshore environment (several kilometers away), subject to high temperatures (sometimes more than 120° C.) and to high pressure (several hundred bars).

The solutions of the prior art using electrical sensors (accelerometers, electrical strain gages, thermocouples) are not considered as being reliable as permanent measuring tools for temperatures exceeding 120° C. Their lifetimes are too short (operators presently demand an operating time guaranteed over 20 years). Further, the cost for replacing such electrical sensors is high, because production standstill may be required in the case of the blocking of a conduit by a hydrate plug. Finally, such electric sensors require a remote power supply as well as local electronic conversion allowing the signal to be transferred over a long distance. The measuring systems installed today require, because of their diversity, different associated networks for conveying the corresponding information (recovery of information is accomplished by a ROV (Remote Operating Vehicle) or by dedicated umbilical cables), which considerably complicates the cabling, the data processing and archiving and precludes real-time operation.

The oil rig operators wish to have instrumentation tolerant to the assembly method and to the offshore conditions of use, so as to perform measurements at a distance (multikilometer offset) of the temperature distribution and axial deformations (tensile and flexural stresses) and transverse deformations (pressures) of the tubes used. The sensors should therefore be passive (without any remote electric power supply) and connected to the surface through a single cable which may contain several optical fibers. Such instrumentation should be able to provide in real time the required information for maintaining the vein fluid (temperature, internal pressure and change in the pressure of the fluid) and guaranteeing the operational condition of the installations (measurement of the axial deformation and flexure, orientation and amplitude of the flexural moment).

Several technological solutions using optical sensors provide a solution to such a problem of measuring temperature, pressure, and change in internal pressure for fluid flowing within a conduit, as well as following it up as regards fatigue. These solutions may be distributed measurement systems, i.e., systems for continuous measurement along an optical fiber (DTS (Distributed Temperature Sensor)-Raman and Brillouin-OTDR (Optical Time Domain Reflectometry)), or discrete or point measurement systems (interferometric sensors and sensors with Bragg gratings).

1. Distributed Measurement Systems

The DTS-Raman system only partly meets the posed problem as strictly it only measures temperature. Such a system should therefore be accompanied by one or several other systems for measuring deformation, which increases the cost of the global system, and complicates the data processing. On the other hand, with the Brillouin-OTDR systems, it is possible to integrally meet the specification requirements of measurement in an oil environment, as they potentially give access to distributed measurements of temperature and deformation along a fiber. However, such systems are not very numerous and very expensive, and they only allow static measurements (the response time varying from a few minutes to a few hours). Therefore they do not allow sudden pressure changes to be detected over a few tenths of a second.

2. Discrete Measurement Systems

In addition to the interferometric sensors in white or coherent light, the sensors which are the most used in the oil sector, are sensors with Bragg gratings.

A Bragg grating actually consists in a periodical perturbation of the refractive index in an optical guide, for example an optical fiber. It behaves as a spectrally selective mirror. Thus, when an optical signal with a larger spectral band is injected into an optical fiber within which a Bragg grating has been photo-inscribed, only a fine spectral line (with a width of about 200 pm) extracted from the incident signal is reflected whereas the remainder of the signal is transmitted without any alteration. Optical telecommunications use in priority wavelengths close to 1.55 µm (C band) and the majority of optical components (both passive and active) were developed for this wavelength range.

The document referenced as [2] thus describes transducers with Bragg gratings positioned along grooves provided in the annular steel reinforcement parts of a cable riser. These transducers are sensitive to the internal pressure, the axial deformations and the flexure of such a cable. In order to separate these contributions, two gratings are attached in a diametrically opposite way on each reinforcement part. This principle is suitable for tubes of towers (risers) with metal frames but is absolutely unsuitable for metal tubes.

The object of the invention is to solve the problems mentioned earlier, and this in a global way, by proposing an instrumented tubular device with which all the parameters useful to the operator may be measured, i.e. the static internal fluid pressure, its temperature, the internal fluid overpressure, the fluid flow rate, the longitudinal loading of the tube, the flexural moment and the orientation, by having an optimized architecture, i.e., a minimum number of locations and sensors.

DISCUSSION OF THE INVENTION

The invention relates to an instrumented tubular device for the transport of a pressurized fluid comprising a tube, in which this fluid flows, with which means for measuring the main deformations of this tube, and means for measuring the temperature of the fluid in the tube are associated, characterized in that this tube is equipped with measuring means integral with its surface and offset by at least one remote optical cable towards an optoelectronic measuring system, in that these measuring means are means for assembling at least two non-parallel optical fibers which comprise at least three assemblies of at least two optical gages with Bragg gratings, said at least three sets being attached in at least three measurement locations distributed along the tube, connected with each other and connected to the remote optical cable through optical fibers, and in that at least one assembly further comprises a temperature gage.

These measurement means may be pre-assembled on a support or directly attached on the remote cable.

These measuring means may be assembled so as to form at least one rosette. Advantageously, each rosette forms a flexible bidimensional sensor, for example formed with assembled polyimide sheets.

Advantageously each assembly comprises three gages for measuring the deformations of the tube.

Each sensor comprises a portion for measuring deformations and a portion for measuring temperature. The portion for measuring deformations may consist of a single mode optical fiber on which Bragg gratings have been photo-inscribed, wound and kept adhered between two sheets for example of polyimide or Kapton, the fiber inputs/outputs being protected by capillaries for example in plastic, the fiber portions including Bragg gratings being exposed. The portion for measuring temperature may comprise a Bragg grating adhered onto a metal plate. Advantageously, the metal plate is of the same nature as the metal of the tube.

In a first embodiment, the device of the invention comprises at least three measurement casings, in which three sensors insulated from the external hydrostatic pressure, connected through tubular connectors, are positioned respectively. The central casing of each assembly is connected to the measurement instrumentation through a remote optical cable. The casings and the connectors are welded together in order to form a rigid assembly. The remote cable consists of a stainless steel tube filled with gel and containing several single mode optical fibers, of a weave in steel wires separated by plastic sheaths. The central casing incorporates a base intended for providing the connection to the remote optical cable.

In a second embodiment, the device of the invention comprises at least three sensors covered with a protective coating. This coating may be a polymer coating with a thickness between 3 and 4 centimeters. A distribution box provides the connection between the sensors of each assembly and a main optical cable connected to the measurement instrumentation. Spreading out strain on the main cable is performed by strapping this cable along the tube. The remote cable is included in the protective coating.

The device of the invention may be used in the field of offshore oil exploration and in the field of transport of gas or hydrocarbons.

The device of the invention benefits from the advantages of metrology with Bragg gratings, i.e.:
  no electromagnetic interferences (optical measurement),
  wavelength multiplexing and read-out (spectral signature is independent of the fluctuations of optical power),
  point measurements,
  significant offset of the measurement (kilometer ranges) and cabling flexibility,
  stability over time and durability in severe environments,
  measurements in a usual range of temperatures (−20° C., +90° C.),
  no requirement for a permanent connection (the instrumentation is connectible and disconnectible at will) because of the absolute measurement of wavelengths,
  very low insertion losses so the sensors may be mounted in series along a single measurement line,
  optimization of the cost of the measurement point by virtue of multiplexing with a single acquisition unit common to all the sensors,
  multiparameter measurements (temperature, deformations) uniformized in a single acquisition unit and a single processing and display protocol (consistence in the analysis and storage of the data).

The different fields concerned by the device of the invention are the oil and gas industries and in general, all industries which require transport of fluid through tubes or pipelines over long distances under conditions of land-based or deep offshore operations.

In oil exploration, the invention finds immediate application in monitoring mechanical fatigue induced by the loading and the marine activity on the export lines and risers (riser tower, catenary risers), notably near loading buoys and the point of contact with the ground (touch down point).

Another important application of the invention concerns control of production through following up the fluid vein in order to make sure that the pressure and temperature conditions are normal so as to prevent any occurrence of a plug in the conduit as well as flow perturbation phenomena (slugging) which may lead to interruption of production. The distribution of the measurement locations along the tube is original in the sense that it allows determination of the flexural amplitude and its orientation and simultaneous establishment with the same scheme, of the time auto-correlation of the overpressures in order to infer the fluid flow rate therefrom. This is a notable advance as the devices from the known art apply separate solutions or even based on different principles or technologies, in order to achieve the same goals. With the invention, it is possible to obtain all the sought-after information (temperature, axial loading, flexure and orientation, pressure and internal overpressure, fluid flow rate) with an optimized number and placement of sensors.

The invention also finds immediate application in the land-based networks for transporting gases and hydrocarbons. Certain networks (for example, in Alaska or in Arctic or sub-arctic areas) are not monitored and may break or crack because of corrosion and thermomechanical fatigue phenomena (for example, tubes laid on permafrost).

SHORT DESCRIPTION OF THE DRAWINGS

FIGS. 3A, 3B and 3C illustrate measuring means of the device of the invention, which are means for assembling at least two non-parallel optical fibers.

DETAILED DISCUSSION OF PARTICULAR EMBODIMENTS

The instrumented tubular device (or smart pipeline) of the invention is a traditional tube, partially exposed and then covered with its heat insulator, equipped with a set of optical gages, pre-positioned and then adhered onto its surface and offset by one or several submarine optical cables towards an optoelectronic measurement system. This measurement system may be placed at the surface, on land or on the sea.

This assembly of gages comprises rosettes, which are assemblies of several gages with which the deformations may be determined along different orientations of the support, here a tube, on which they are attached along several directions, as described in the document referenced as [3]. This document actually describes an optical micro-system of the planar rosette type with strain gages with dielectric guides, intended for measuring a system of constraints applied to one part, in which, the part being a part with a purely longitudinal stress, at least one rosette is formed by at least two strain gages with dielectric guides, and in which a computational circuit enables said stress to be determined by resolving a system of equations.

Figure 3A:
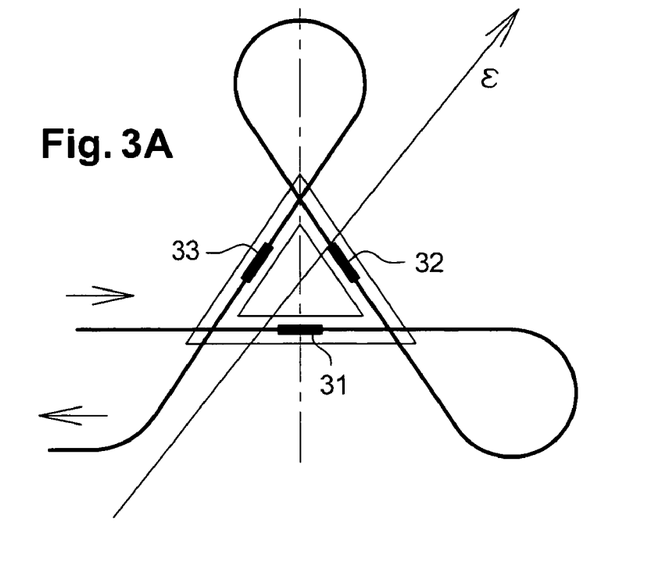
FIG. 3A illustrating an example of a rosette with Bragg gratings of the delta type, and FIGS. 3B and 3C, two alternative embodiments.
Figure 3B:
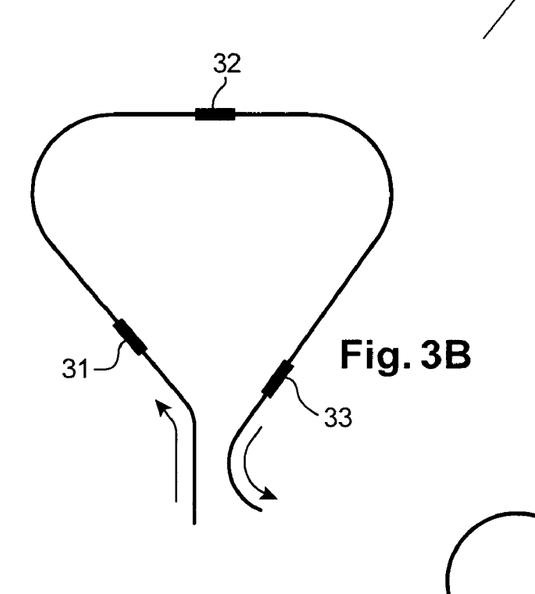
Figure 3C:
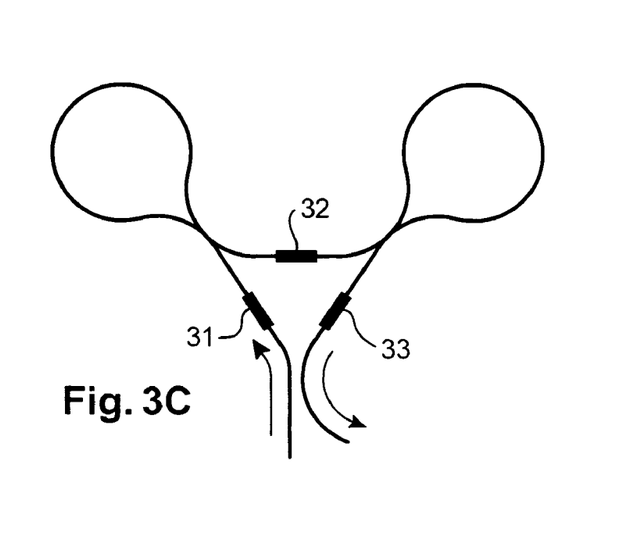

In the following description, the gage assemblies considered as an example are rosettes, as illustrated in FIG. 3A. But the measurement means of the instrumented tubular device of the invention are more generally means for assembling at least two non-parallel optical fibers as illustrated in FIGS. 3A, 3B and 3C, which may be pre-assembled on a support or directly attached on the remote cable.

In the device of the invention, each rosette may be made as a two-dimensional flexible sensor for example formed with assembled polyimide sheets. This sensor comprises three gages for measuring deformation with which both main deformations (transverse and axial deformations) may be determined independently of the angular positioning of the rosette on the tube, so as to attach, for example bond, this sensor on this tube without any particular precaution, in an uncontrolled industrial (tube manufacturing) environment. This sensor may only comprise two gages but specifically orientated one along the axis, the other transversely. Moreover, a temperature gage may also be inserted into this sensor in order to measure its temperature as close as possible to the deformation gages, and with which the thermal contributions may be separated from the purely mechanical contributions (transverse and axial deformations). In the following description, the term "sensor" refers to such a sensor of the rosette type.

The device of the invention is equipped with at least three measurement locations, protecting the sensors from external impacts, connected together and connected to a remote cable (towards the surface) through optical fibers. These locations are positioned in different positions along the axis of the tube and directed according to several angles of its section (advantageously every 60°).

In an exemplary embodiment, the device of the invention comprises a tube with a length of 24 meters and a diameter of about 12 inches (30 centimeters), equipped with distributed measurement locations. All these locations accommodate a sensor. Advantageously, the central location includes a rosette B2 with four gages (three strain gages and a gage for measuring temperature) whereas the two side locations each include a rosette B1 or B3 with three strain gages. Measurement of temperature, which is considered to be homogenous, over the whole of the measuring area, may be provided by the central rosette B2 exclusively. This device in this instrumented portion therefore comprises at least 10 gages. If the temperature were not homogenous circumferentially, each rosette may contain three strain gages and a temperature gage, which leads to 12 gages in this instrumented portion.

The device of the invention is intended to be able to be inserted directly on the oil production site without any specialized intervention. It may remotely provide via optical fiber(s), the following measurements:
  the internal temperature in the fluid flowing in the tube,
  the pressure and the internal change of pressure of the fluid,
  the axial loading, the flexural radius of curvature of the tube, the orientation of this flexure relatively to its section.

With it, measurement of flow rate may further be carried out by dynamic analysis of the pressure waves.

The device of the invention comprises two embodiments according to whether the locations are insulated or not from the external hydrostatic pressure (water depth). In a first embodiment, three measurement casings insolated from the external hydrostatic pressure and connected through tubular connectors, are positioned in these measurement locations. In a second embodiment, three sensors covered with polymer coating with a thickness from 3 to 4 centimeters which protect them from the marine medium, from impacts and friction, are positioned in these measurement locations.

First Embodiment of the Invention

Figure 2A:
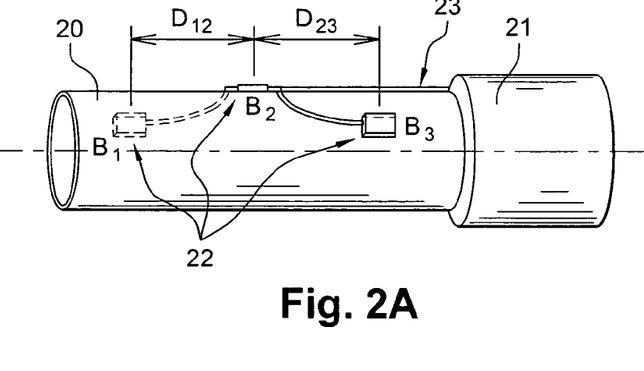
FIGS. 2A and 2B illustrate an instrumented portion, after removing the heat insulated area, of the device of the invention in a side view and in a sectional view.

In this first embodiment, the three locations 22 are occupied by casings, in which three sensors insulated from the external hydrostatic pressure, are positioned respectively. Each instrumented portion of the device of the invention, illustrated in FIG. 2 after removing the heat insulator 21, comprises a preassembled assembly consisting of a least one central casing B2 and two side casings B1 and B3, preformed tubular connectors 24 (with the tube diameter) connecting the casings with each other and a remote optical fiber (or "offset" optical fiber) 23 connecting the central casing B2 to the measurement instrumentation located at the surface. The casings are installed along the axis of the tube (for example every decimeter) and according to different angular orientations. In the remote cable (or "offset" cable) leading to the instrumentation at the surface, a set of three casings therefore corresponds to one optical fiber.

Figure 2B:
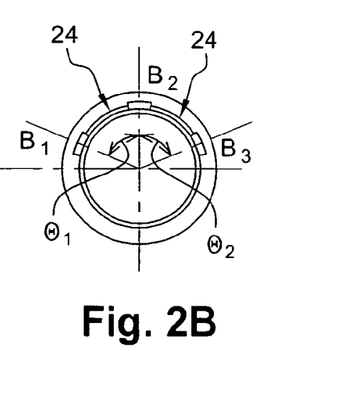

FIG. 2B shows a distribution of the casings at 60° ($\theta1=\theta2=60°$), as an example. But other angular configurations are possible. Also the distribution and the interconnection method of the casings may be different. The remote cable 23 may be connected to the casing $B_3$ or to the casing $B_1$, for example. These casings $B_1$, $B_2$ and $B_3$, with typical dimensions (height×length×width=4 cm×20 cm×10 cm) are used for pre-positioning the sensors in order to facilitate their installation at the tube manufacturer and for introducing a polymer seal. They also have a mechanical function of spreading out strains.

The procedure for assembling the device of the invention then includes the following steps:

preparing a pre-assembled assembly of casing+connectors, fitting this assembly on the tube by welding, assembling optical components on the tube 20 (at the tube manufacturer) with them being covered by the heat insulator 21, temperature, loading and flexure calibration before transporting and installing it on the production site.

Second Embodiment of the Invention

In this second embodiment, the device of the invention is instrumented with sensors located in locations similar to those of the first embodiment. This time, the sensors are directly adhered to the tube without protective casings against the external hydrostatic pressure. The sensors of a same instrumented portion of the device of the invention, or double-joint sensors, are connected to each other through a remote optical cable, which is connected to a main optical cable at a distribution box, positioned at the head of the instrumented portion. The sensors and the remote optical cable are embedded in a coating which seals them from the external medium, hermetically. The main optical cable connects the distribution box and the instrumentation located at the surface. This distribution box enables the seal of the main and remote optical cables to be guaranteed. The distribution of the optical fibers along the tube in multiple instrumented portions is provided in an industrialization phase.

The procedure for assembling the device of the invention then comprises the preparation of the measurement components. As soon as these components have been put into place, a coating is added over the whole exposed portion in order to protect these components, as well as the connection of optical cables. The heat insulator is then added over this coating in order to insulate the assembly from external impacts and to provide its protection against heat. Spreading out strain on the main optical cable is performed by strapping the latter along the tube.

Now, the steps of the procedure for assembling the device of the invention will now be considered in more detail in these two embodiments.

1. Preparation of the Measurement Components

A. Producing Rosettes with Bragg Gratings

Figure 4A:
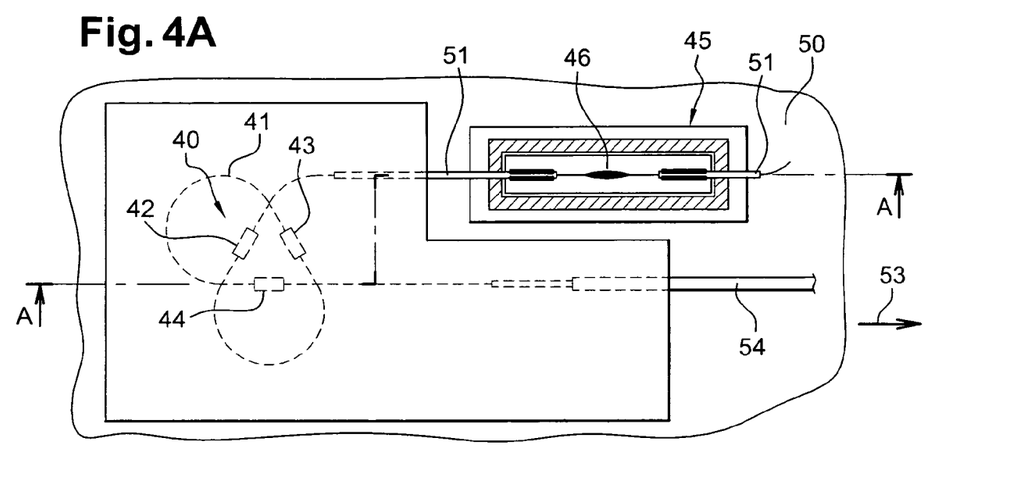
FIGS. 4A and 4B illustrate the composition of rosettes used for the instrumentation of the device of the invention in a top view and in a sectional view along A-A.
Figure 4B:
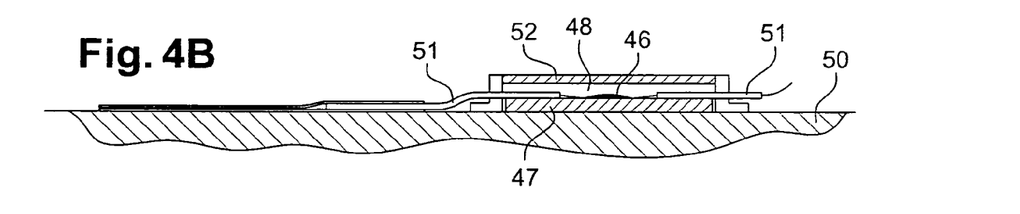

As illustrated in FIGS. 4A and 4B, a sensor is used, which includes a first portion for measuring deformation 40 consisting of a winding of single mode fiber 41 (forming an equilateral triangle) on which Bragg gratings 42, 43 and 44 have been photo-inscribed by known techniques (phase mask and UV laser) in well determined positions along the latter. This fiber 41 is kept wound by bonding it between two sheets for example of polyimide or even Kapton.

The most used configurations of these rosettes are indeed delta rosettes consisting of three gratings 31, 32 and 33 or 42, 43 and 44, positioned at 120° (or 60°) relatively to each other, as illustrated in FIGS. 3A and 4A, and the rectangular rosettes involving an angle of 45°.

The portions of the fiber 41 including Bragg gratings 42, 43, 44 are exposed so as to allow direct fiber-structure bonding (without any Kapton interface).

This sensor also includes a second portion for measuring temperature 45 which comprises a grating 46 adhered onto a metal plate 47, for example in steel, with the same composition as the steel which was used for building the tube (for example X52 steels with a thermal expansion coefficient $K\sim11.10^{-6}\,K^{-1}$).

The metal plate 47 is kept in thermal contact with the surface of the tube 50 in order to guarantee that the portion for measuring temperature 45 is at the same temperature as the portion for measuring deformations 40. A self-compensation method provides suppression of the effect induced by temperature on the axial sensor.

In order to avoid failure of the fiber 41 by shearing, the inputs/outputs of the latter are protected by means of plastic capillaries 51 (with a diameter of about 900 pm) slipped onto the latter and sealed in the sensor.

References 52, 53 and 54 illustrate a protective lid 52, the axis of the tube 50 and the remote optical cable, respectively.

B. Realization of a Preassembled Assembly of Casing+Connectors (in the First Embodiment)

The tubular connectors (for example in stainless steel, with a diameter from about 5 mm to 6 mm) are cut out to a determined length according to the diameter of the tube 60. As an example, for a tube with a diameter of 30 cm (12 inches), the length of a connector is about 10 cm. Each connector is welded between two casings so that the assembly is mechanically rigid.

Figure 5A:
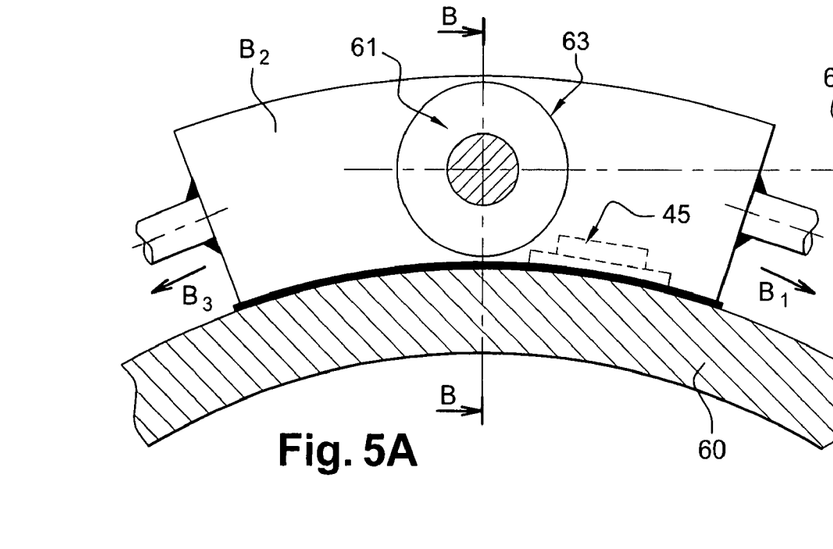
FIGS. 5A and 5B illustrate the main casing and the connection of the latter with the remote cable in a first embodiment of the device of the invention, in a transverse sectional view and in a sectional view along B-B.
Figure 5B:
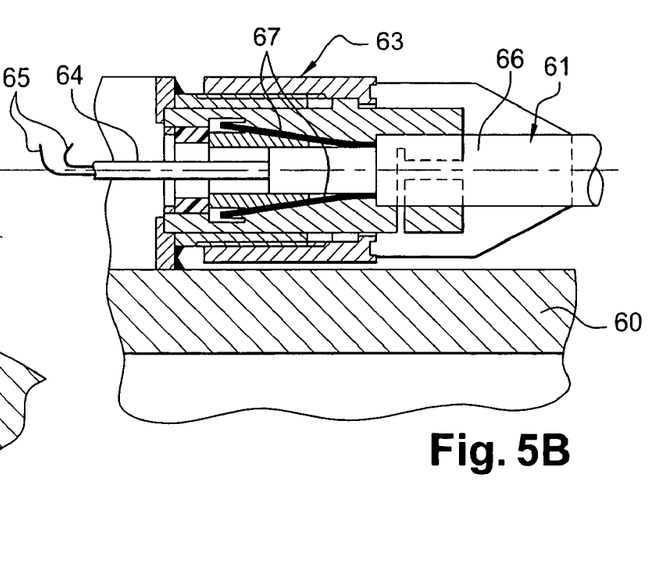

Differently from the casings B1 and B3, the main casing B2 has the additional function of providing the spreading out of strain of the remote cable 61. For this, it incorporates a base 63 intended for providing the connection with the remote optical cable 61 as illustrated in FIGS. 5A and 5B.

In order to avoid corrosion of the steels (cable, connectors, casings), protection with a consumable (zinc, for example) electrode is provided for the whole of the metal parts of the device of the invention.

C. Preparation of the Remote Optical Cable

The remote optical cable 61 consists of a stainless steel tube 64 (with a typical diameter equal to about 2.8 mm) filled with gel and which may contain a dozen of single mode optical fibers 65, with a weave of galvanized steel wires 67 (with a typical diameter equal to about 1 mm) separated by plastic sheaths.

In the first embodiment, the cable 61 may be connected to the central casing $B_2$ via a dedicated assembly such as the one illustrated in FIGS. 5A and 5B, which is standard for one skilled in the art.

The fibers are first of all extracted from this cable 61 over a length of about 50 cm in order to engage them into the tubular connectors 64 and allow optical welding operations, (in the second embodiment, the fibers are then engaged into polymer guides).

The steel wires 67 used as weaves are then spread out and mechanically tightened in a conical assembly in order to ensure spreading out of the strain. The cladding 66 of the optical cable 61 is then mechanically tightened in order to prevent this cable from sliding.

A polymer is then bonded onto the cable 61 in order to make it integral with the end of this assembly so as to form a connector which limits the mechanical fatigue of the cable by preventing it from warping under flexure during placement operations.

Figure 6A:
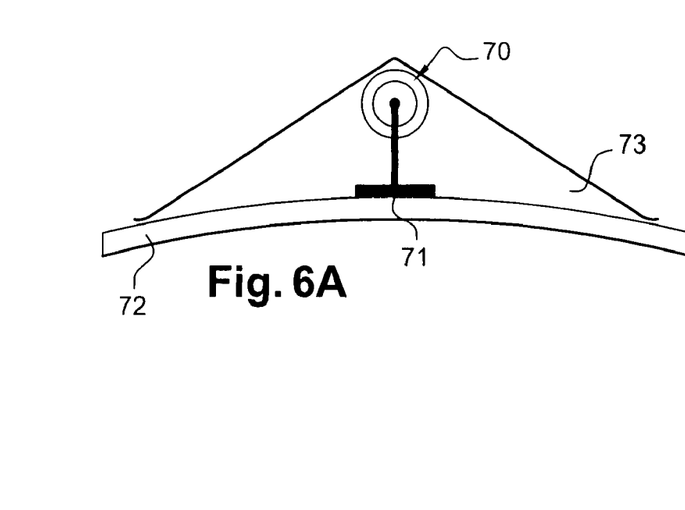
FIGS. 6A and 6B illustrate the connection between the remote cable and a sensor according to a second embodiment of the device of the invention, in a transverse sectional view and in a longitudinal sectional view.
Figure 6B:
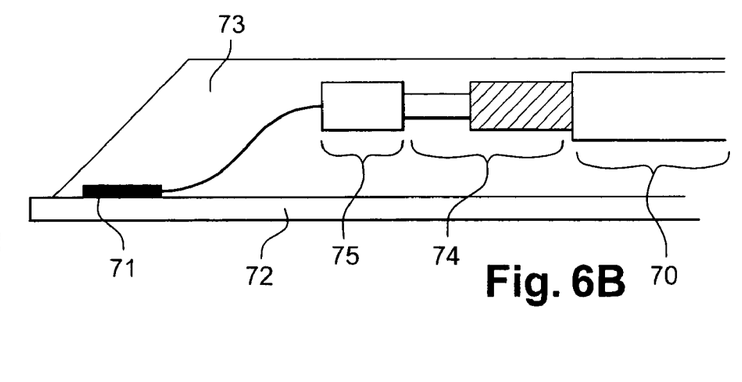

In the second embodiment, connection between the sensors is achieved by a remote cable included in the protective coating of the sensors. This cable connects all the sensors of an instrumented portion. Spreading out of strain and the seal of this cable are provided by a distribution box located on the top of the instrumented portion. This distribution box may also be loaded in order to re-distribute the optical fibers of the main cable to the remote cables along the different instrumented portions. Spreading out of strain of the main cable is achieved by strapping along the tube. As illustrated in FIGS. 6A and 6B, the spreading out of strain of a remote cable 70 is achieved by bonding the latter in the coating 73 of the sensors 71 at the surface of the tube 72. In FIG. 6B, a fiber protection 74 and a splice 75 are also illustrated.

2. Fitting these Components on the Tube

If the tube is already heat insulated, the latter needs to be locally de-insulated on the three locations to be instrumented as well as on the passages of the cord. This operation may be carried out by turning over a length of the order of 1 to 2 meters, or by local milling in order to only clear the useful areas. The thereby cleared metal surface is then advantageously rectified in order to eliminate any defect and surface oxidization.

In the first embodiment, the preassembled assembly formed by three casings and the tubular connectors is applied on the exposed areas and the three casings are spot-welded on the tube in order to impart mechanical stability to the assembly and to allow spreading out of strain of the remote cable, as illustrated in FIGS. 5A and 5B. The main casing has a typical thickness of the order of 40 mm. The stiffness of the added casings is negligible relatively to the stiffness of the tube. The thermomechanical behavior of this tube is therefore not changed by the attachment of this assembly.

In the second embodiment, the sensors are bonded on the tube, as well as the remote fibers which are protected by polymer capillaries. The remote fiber and the sensors are entirely embedded in a protective coating. The remote cable is connected to a distribution box allowing this remote cable to be connected to the main optical cable. The main optical cable is maintained on the tube by strapping in order to provide the required spreading out of strain.

3. Assembling the Instrumented Tube

The remote cable is first of all connected on the main casing as illustrated in FIGS. 5A and 5B. The fibers are then distributed towards the different locations. The rosettes are then welded to the fibers and the excess fiber (as well as the sleeve for protecting the weld) is wound and bonded to the inside of the casings in the first embodiment of embedded into the coating in the second embodiment. The rosettes may be bonded on the surface of the tube by means of an epoxy adhesive, with the use of a heating belt with very strong heating power (typically 100 $kW/m^2$). A grooved lid 52, letting the fiber in and out is welded or bonded on the surface of the tube, by covering the steel plate 47 of FIG. 4. A filling polymer, advantageously silicon, is injected into the interior 48 of this lid.

Silicon has the double advantage of withstanding high temperatures (above 150° C.) and of absorbing vibrations without transmitting mechanical stresses which are applied to it.

The steel plate 47 bearing the temperature grating is therefore held, while remaining free to expand.

The metal protection of the temperature sensor is then coated in an epoxy type adhesive (loaded with stainless steel for example) in order to guarantee pressure tightness.

In the first embodiment, the interiors of the casings are then filled with a stiff coating polymer (a stainless steel loaded epoxy resin for example). The upper portion of these casings is covered with this polymer hence providing the seal of the whole of each casing as well as the inner seal with the connectors and the cable. The optical portions are then insensitive to the external hydrostatic pressure but only sensitive to temperature and to deformations. The heat insulator is then re-injected over the casings and the connectors in order to re-establish heat protection.

In the second embodiment, the coating covers the sensor and the remote optical cable. The heat insulator is then re-injected on this coating. The optical portion for measuring deformation is then sensitive to the deformations of the tube and to the external hydrostatic pressure.

4. Calibration

Optoelectronic acquisition systems are known, with which Bragg wavelengths of optical sensors with Bragg gratings may be measured.

As an example, a first system uses a light source with a wide spectrum which illuminates all the Bragg gratings present on the measurement line and a tunable interferometric cavity ((Fabry-Perot) which allows their respective spectra to be measured. Wavelength calibration is obtained by means of stabilized reference gratings (both stabilized mechanically and in temperature) with which an absolute wavelength measurement may be obtained.

A second system also uses a light source with a wide spectrum, but with a linear filter as a wavelength discriminating element. The measurement of the transmission ratio through this calibrated spectral filter provides the sought-after wavelength information.

These systems have a response time compatible with the detection of a pressure front (less than 0.1 s) in the tube in order to allow measurements of fluid flow rate.

A functional test of the instrumented tube may be performed in order to make sure that the optical portions are operational (connection assessment) and to calibrate the response of the tube depending on the loading. It is required Parameters d and r, respectively called the "spherical portion" and "deviator" are given in the table below for both of the most current rosette configurations (45° and 120°). Each measurement location provides three deformations $\in_a$, $\in_b$, $\in_c$. For each location, $\in_t$ and $\in_z$ may be inferred therefrom. In the following, $\in_1=\in_{z1}$, $\in_2=\in_{z2}$ and $\in_3=\in_{z3}$ are called the three components of axial deformations.

| Rosette type with three gages | Rosette at 120° | Rosette at 45° |
|---|---|---|
| Spherical portion (d) | $3 \cdot d = \epsilon_a + \epsilon_b + \epsilon_c$ | $2 \cdot d = \epsilon_b + \epsilon_c$ |
| Deviator (r) | $3 \cdot r = \dfrac{\epsilon_b + \epsilon_c - 2 \cdot \epsilon_a}{\cos(2 \cdot \alpha)}$ | $r = \dfrac{\epsilon_b - \epsilon_c}{2 \cdot \cos(2 \cdot \alpha)}$ |
| Rosette-main axis inclination | $\tan(2 \cdot \alpha) = \sqrt{3} \cdot \dfrac{\epsilon_b - \epsilon_c}{2 \cdot \epsilon_a - \epsilon_b - \epsilon_c}$ | $\tan(2 \cdot \alpha) = \dfrac{d - \epsilon_a}{\epsilon_b - d} = \dfrac{\epsilon_c + \epsilon_b - 2 \cdot \epsilon_a}{\epsilon_b - \epsilon_c}$ |
| Deviator function | $r_{120} = \dfrac{1}{3} \cdot (\epsilon_a - \epsilon_c) \sqrt{3 + \left(2 \cdot \dfrac{(\epsilon_b - \epsilon_c)}{\epsilon_a - \epsilon_c} - 1\right)^2}$ | $r_{45} = \dfrac{1}{2} \cdot (\epsilon_b - \epsilon_c) \cdot \sqrt{1 + \left[2 \cdot \dfrac{\epsilon_a - \epsilon_c)}{\epsilon_b - \epsilon_c)} - 1\right]^2}$ | that the instrumented tube portion be placed on a mechanical testing machine such as the one described in the referenced document [4]. With this machine it is possible to exert a loading stress (causing axial deformation) and flexural stresses. Measurement of the orientation of the flexure may be tested by positioning the tube in different angular positions relatively to the measurement frame.

As soon as the different steps for mounting the device of the invention have been performed, it is then possible to perform measurements and to utilize the results obtained in the following way.

1. Measurement of the Main Deformations

Each tube includes at least three positions each including a rosette type sensor with three or four gages (three gages for measuring deformation and optionally a gage for measuring temperature).

A method for measuring the main deformations from the deformations measured by each of the gages forming a rosette is described in the referenced document [3].

A first gage may be approximately bonded along the axis of the tube. In an industrial situation, as the bonding conditions are actually well controlled, there often remains a small positioning error in particular due to sliding upon bonding at a high temperature (when the epoxy adhesive becomes very fluid). A certain angle generally remains between the axis z of the tube and the final position of the sensor after bonding. Let $\alpha$ be this angle between the main direction orientated along the axis of the tube and this first gage.

The main deformations are determined, independently of this angle $\alpha$, by solving the following system of equations:

$$\begin{cases} \varepsilon_t = \dfrac{d+r}{2} \\ \varepsilon_z = \dfrac{d-r}{2} \end{cases} \quad (1)$$

2. Calculation of the Fluid Static Pressure and Axial Deformation from the Main Deformations of the Different Sensors The tubes used in oil production are characterized by a low thickness-over-radius ratio with a typical minimum value of 1/20. Axial loading of flexure mainly occurs by axial deformation accompanied by a transverse deformation (Poisson's law). Also, the changes in internal and external pressures mainly occur by transverse deformation accompanied by axial deformation.

Let $P_f$ be the internal pressure of the fluid. The pressure differential between the internal and external portions of the tube is noted as $P=P_f-P_e$. The transverse deformation induced by this pressure differential P on the tube at the recessed ends is then written as:

$$\varepsilon_t = \dfrac{P \cdot R}{E \cdot t} \cdot \left(\dfrac{2-\nu}{2}\right) = K \cdot P \quad (2)$$

wherein R is the average radius of the tube, t its thickness, wherein E is Young's modulus of the steel of the tube (about 193 GPa) and $\nu$ is its Poisson coefficient ($\nu \sim 0.29$), this law being given as an indication.

In practice, pressure calibration is performed in order to determine the experimental value of the K coefficient to be taken into account.

In the following, the first embodiment is considered. To simplify the heat self-compensation calculation, the main deformations $\in_t$ and $\in_z$ are converted into wavelength shifts $\Delta\lambda_t$ and $\Delta\lambda_z$ according to $\Delta\lambda_t=(1-pe)\cdot\in_t\cdot\lambda_t$ and $\Delta\lambda_z=(1-pe)\cdot\in_z\cdot\lambda_z$. These shifts do not have any physical reality and are used as a basis for the calculation. The thermo-mechanical behavior of a tube with a small thickness, recessed at its ends, simultaneously subject to a pressure differential (internal-external pressure) P, to axial deformation $\in$ and to a change in temperature $\Delta T$ (relatively to a reference temperature), is expressed by the following system of equations:

$$\begin{cases} \Delta\lambda_t = (1-p_e)\cdot\lambda_t\cdot[K\cdot P - v\cdot\varepsilon] + \lambda_t\cdot[(1-p_e)\cdot\alpha + \xi]\cdot\Delta T \\ \Delta\lambda_z = (1-p_e)\cdot\lambda_z\cdot[K'\cdot P + \varepsilon] + \lambda_z\cdot[(1-p_e)\cdot\alpha + \xi]\cdot\Delta T \end{cases} \quad (3)$$

into which the second parameter $$K' = K\cdot\frac{(1-2v)}{(2-v)} \quad (4)$$

is introduced.

An additional measurement of temperature is obtained by the grating for measuring temperature bonded on a steel support (thermal self-compensation mode). The wavelength of this grating changes according to the relationship:

$$\Delta\lambda_T = \lambda_T[(1-p_e)\cdot\alpha + \xi]\cdot\Delta T \quad (5)$$

wherein $p_e$ is the photo-elastic coefficient of silica (0.22), $\alpha$ is the thermal expansion coefficient of steel (11.10$^{-6}$/° C. for X52 steel) and $\xi$ is the thermo-optical coefficient of silica (about 7.10$^{-6}$/° C.). Such a realization has the advantage of higher temperature sensitivity (by about a factor 2) relatively to that of a free Bragg grating (not bonded), so that the accuracy of the temperature measurement may be improved relatively to the correction method.

Equation (3) shows that the pressure and the deformation are related through a matrix system (with matrix M) to the measured wavelengths, according to the law:

$$\begin{pmatrix} \Delta\lambda_t - \frac{\lambda_t}{\lambda_T}\cdot\Delta\lambda_T \\ \Delta\lambda_z - \frac{\lambda_z}{\lambda_T}\cdot\Delta\lambda_T \end{pmatrix} = \begin{bmatrix} M_{11} & M_{12} \\ M_{21} & M_{22} \end{bmatrix}\cdot\begin{pmatrix} P \\ \varepsilon \end{pmatrix} \quad (6)$$

Determination of the P and $\in$ parameters thereby requires that the relationship (6) be inverted.

In the case of the thermal self-compensation method, the wavelength of the temperature measurement grating is taken as a new spectral reference, the temperature measurement itself being referenced relatively to a thermalized reference grating, placed in the acquisition unit located at the surface. In practice, the terms $\lambda_t/\lambda_T$ and $\lambda_z/\lambda_T$ are generally very close to 1 (within ±2%). One then proceeds with the following change of variables:

$$\begin{cases} \lambda'_t = \lambda_t - \lambda_T \\ \lambda'_z = \lambda_z - \lambda_T \end{cases} \quad (7)$$

The inversion of this 2×2 matrix provides the following experimental calibration matrix Ci:

$$\begin{pmatrix} P \\ \varepsilon \end{pmatrix} = \begin{bmatrix} C_{11} & C_{12} \\ C_{21} & C_{22} \end{bmatrix}\cdot\begin{pmatrix} \Delta\lambda'_t \\ \Delta\lambda'_z \end{pmatrix} \quad (8)$$

For which the coefficients are given by:
$$\begin{cases} C_{11} = \frac{E\cdot t}{(1-p_e)\cdot\lambda t\cdot R(1-v^2)} \\ C_{12} = \frac{E\cdot t\cdot v}{(1-p_e)\cdot\lambda_z\cdot R\cdot(1-v^2)} \\ C_{21} = \frac{-(1-2\cdot v)}{2\cdot(1-p_e)\cdot\lambda t\cdot(1-v^2)} \\ C_{22} = \frac{(2-v)}{2\cdot(1-p_e)\cdot\lambda_z\cdot(1-v^2)} \end{cases} \quad (9)$$

Each casing is characterized by its calibration matrix. By solving these systems, values for the pressure differential and the fluid temperature may be obtained, as well as the axial deformations $\in 1, \in 2, \in 3$, independently of the orientation of the sensors on the tube. As the depth h of the water is known, the external pressure is inferred according to the relationship $P_e$ (bar)~0,1. h (m). The internal pressure of the fluid $P_f$ is then inferred according to the relationship $P_f = P + P_e$.

In the second embodiment, the sensors are sensitive to deformations induced by the internal-external pressure differential, but also to the external hydrostatic pressure. Their behavior may then be expressed by the following matrix relationship:

$$\begin{pmatrix} \Delta\lambda_t - \frac{\lambda_t}{\lambda_T}\cdot\Delta\lambda_T - c\cdot P_e \\ \Delta\lambda_z - \frac{\lambda_z}{\lambda_T}\cdot\Delta\lambda_T - c\cdot P_e \end{pmatrix} = \begin{bmatrix} M_{11} & M_{12} \\ M_{21} & M_{22} \end{bmatrix}\cdot\begin{pmatrix} P \\ \varepsilon \end{pmatrix} \quad (10)$$

This relationship involves the same matrix as relationship (6), the effect of the hydrostatic pressure being exerted in an identical way on both measurement components $\lambda t$ and $\lambda z$. In this second embodiment, it is thus necessary to know the external hydrostatic pressure, either by knowing the water depth, of by means of an additional pressure sensor, in order to subtract its effect on the measurement of the P and $\in$ parameters. Solving the system is also carried out according to relationship (8).

The calibration matrix $C_i$ is given as an example for a fitting configuration of the tube (limiting conditions). In reality, calibration occurs after installing the tube, with slightly different parameters.

3. Calculation of the Loading and Flexure

By measuring the three axial deformations $\in_1, \in_2, \in_3$, the deformation contribution $\in$ due to the loading of the flexure imposed to the tube may be separated. This flexure is characterized by a radius of curvature $\rho$ and by its angular orientation $\Psi$ relatively to the central casing. As an example, the case of a distribution of locations every 60° will be considered, as illustrated in FIG. 2. The three parameters $\in$, $\rho$ and $\Psi$ are related through the following system of equations:

$$\begin{cases} \varepsilon 1 = \varepsilon + \frac{\Phi}{2\cdot\rho}\cdot\cos\psi \\ \varepsilon 2 = \varepsilon + \frac{\Phi}{2\cdot\rho}\cdot\cos(\psi + \frac{\pi}{3}) \\ \varepsilon 3 = \varepsilon + \frac{\Phi}{2\cdot\rho}\cdot\cos(\psi - \frac{\pi}{3}) \end{cases} \quad (11)$$

wherein $\Phi$ is the outer diameter of the tube.

This system of equations is similar to that of the delta rosettes with three gages used in analyzing deformations on planar structures.

With this system of three equations enables the three unknowns ($\in$, $\rho$ and $\Psi$) may be determined. The axial deformation is written as:

$$\in = \in_2 + \in_3 - \in_1 \quad (12)$$

The angle $\Psi$ may be determined through the relationship:

$$\tan(\Psi) = \frac{\epsilon 3 - \epsilon 2}{\sqrt{3} \cdot (\epsilon 1 - \epsilon)} \quad (13)$$

With knowledge of $\Psi$ and $\in$, the local radius of curvature $\rho$ is inferred by means of the first equation of the system (11), by applying the well-known trigonometric relationship:

$$\tan(\Psi) = \frac{1}{\sqrt{1 + \tan(\psi)^2}} \quad (14)$$

With the knowledge of the loading deformation $\in$, the loading condition of the tube may be inferred from Hooke's relationship applied to the local section of the tube:

$$F = E \cdot S \cdot \varepsilon \sim \frac{\pi}{2} \cdot \Phi \cdot t \cdot E \cdot \varepsilon \quad (15)$$

For a steel tube with diameter of 300 mm and a thickness of 19 mm, the relationship between the force F and the deformation is of the order of 177 kg/microdeformation.

4. Determination of the Flow Rate by Detecting the Pressure Profile

Unlike a static pressure measurement, a measurement of pressure changes does not require any thermal compensation, or any compensation of the loading effect (inversion of the calibration matrix Ci). Indeed, the temperature and the axial loading change slowly because of the inertia of the structure so that the measurements of overpressures may be directly carried out by preferentially considering the gages bonded transversely (for which the pressure sensitivity coefficients are the highest).

By distributing the casings in different positions along the axis of the tube, an optical flow meter may be made, which uses auto-correlation (cross-correlation) of the measurements of pressure changes over time, as described in the referenced document [5]. This document actually describes the principle of measurement of flow by auto-correlation, by placing at least three pressure sensors $P_1$, $P_2$ and $P_3$ at different abscissae along a tube and by observing the change in pressure differences $P_1-P_2$ and $P_2-P_3$ versus time. The auto-correlation function is then calculated between these two pressure differences (over a typical time window of 2 seconds) in order to infer therefrom the propagation time of the vortex overpressure inside the fluid. With the thereby achieved auto-correlation, it is possible to get rid of the acoustic pressure perturbation with wavelength larger than the interval between casings (spatial filtering effect). By knowing the average distance between both pressure taps, the flow rate of the fluid may be inferred non-intrusively (without having to generate any Venturi effect).

REFERENCES

[1] U.S. Pat. No. 5,218,197
[2] "Development of an optical monitoring system for flexible risers" of M. Andersen, A. Berg and S. Saevik (Offshore Technology Conference (OTC), 13201, Houston (TX), 30th Apr.-3 May 2001)
[3] U.S. Pat. No. 5,726,744
[4] "Intelligent pipelines using fiber optics sensors" of R C. Tennyson, W. D. Morison, and G Manuelpillai (SPIE, Smart structures and materials, San Diego, 2nd-6 Mar. 2003, Vol. 5050, pages 295-304)
[5] U.S. Pat. No. 6,536,291

The invention claimed is:

1. An instrumented tubular device for transporting a pressurized fluid comprising a tube in which this fluid flows, with which are associated means for measuring the main deformations of this tube, and means for measuring the temperature of the fluid in the tube, characterized in that this tube is equipped with measurement means integral with this surface and offset by at least one remote optical cable towards an optoelectronic measurement system, in that these measurement means are means for assembling at least two non-parallel optical fibers which comprise at least three assemblies of at least two optical gages with Bragg gratings, said at least three assemblies being fixed in at least three measurement locations distributed along the tube, connected together and connected to the remote optical cable via optical fibers, and in that at least one assembly further comprises a temperature gage.

2. The device according to claim 1, wherein the measurement means are preassembled on a support.

3. The device according to claim 1, wherein the measurement means are directly attached on the remote cable.

4. The device according to claim 1, wherein the measurement means are assembled in order to form at least one rosette.

5. The device according to claim 4, wherein each rosette forms a two-dimensional flexible sensor.

6. The device according to claim 1, wherein each assembly comprises three gages for measuring deformations of the tube.

7. The device according to claim 5, wherein each sensor comprises a portion for measuring deformations and a portion for measuring temperature.

8. The device according to claim 7, wherein the portion for measuring deformations consists of a single mode optical fiber, on which Bragg gratings have been photo-inscribed, wound and kept bonded between two sheets, the fiber inputs-outputs being protected by capillaries.

9. The device according to claim 8, wherein the fiber portions including Bragg gratings are exposed.

10. The device according to claim 7, wherein the portion for measuring temperature comprises a Bragg grating bonded on a metal plate.

11. The device according to claim 10, wherein the metal plate is of the same nature as the metal of the tube.

12. The device according to claim 5, which comprises at least three measurement casings, in which three sensors isolated from the external hydrostatic pressure and connected through tubular connectors are positioned respectively.

13. The device according to claim 12, wherein the central casing is connected to the measurement instrumentation through a remote optical cable.

14. The device according to claim 12, wherein the casings and the connectors are welded to each other so as to form a rigid assembly.

15. The device according to claim 12, wherein the remote cable includes a stainless steel tube filled with gel and containing several single mode optical fibers, of a weave of steel wires separated by plastic sheaths.

16. The device according to claim 15, wherein the central casing incorporates a base intended for making the connection with the remote optical cable.

17. The device according to claim 5, which comprises at least one assembly of three sensors covered with a protective coating.

18. The device according to claim 17, wherein the coating is a polymer coating with a thickness between 3 and 4 centimeters.

19. The device according to claim 17, wherein a distribution box provides the connection between the sensors of each assembly and a main optical cable connected to the measurement instrumentation.

20. The device according to claim 17, wherein spreading out of strain on the main cable is performed by strapping this cable along the tube.

21. The device according to claim 17, wherein the remote cable is included in the protective coating.

22. The device according to claim 1, wherein the transported fluid is a gas or a hydrocarbon.

23. An instrumented tubular device for transporting a pressurized fluid comprising a tube in which this fluid flows, with which are associated means for measuring the main deformations of the tube, and means for measuring the temperature of the fluid in the tube, characterized in that this tube is equipped with measurement means assembled in order to form at least one rosette which forms a two-dimensional flexible sensor, the measurement means integral with a surface and offset by at least one remote optical cable towards an optoelectronic measurement system, in that these measurement means are means for assembling at least two non-parallel optical fibers which comprise at least three assemblies of at least two optical gages with Bragg gratings, said at least three assemblies being fixed in at least three measurement locations distributed along the tube, connected together and connected to the remote optical cable via optical fibers, and in that at least one assembly further comprises a temperature gage and at least three measurement casings, in which three sensors isolated from the external hydrostatic pressure and connected through tubular connectors are positioned respectively, wherein a central casing is connected to the measurement instrumentation through a remote optical cable.

24. An instrumented tubular device for transporting a pressurized fluid comprising a tube in which this fluid flows, with which are associated means for measuring the main deformations of the tube, and means for measuring the temperature of the fluid in the tube, characterized in that this tube is equipped with measurement means assembled in order to form at least one rosette which forms a two-dimensional flexible sensor, the measurement means integral with a surface and offset by at least one remote optical cable towards an optoelectronic measurement system, in that these measurement means are means for assembling at least two non-parallel optical fibers which comprise at least three assemblies of at least two optical gages with Bragg gratings, said at least three assemblies being fixed in at least three measurement locations distributed along the tube, connected together and connected to the remote optical cable via optical fibers, and in that at least one assembly further comprises a temperature gage and at least three measurement casings, in which three sensors isolated from the external hydrostatic pressure and connected through tubular connectors are positioned respectively, wherein the casings and the connectors are welded to each other so as to form a rigid assembly.

25. An instrumented tubular device for transporting a pressurized fluid comprising a tube in which this fluid flows, with which are associated means for measuring the main deformations of the tube, and means for measuring the temperature of the fluid in the tube, characterized in that this tube is equipped with measurement means assembled in order to form at least one rosette which forms a two-dimensional flexible sensor, the measurement means integral with a surface and offset by at least one remote optical cable towards an optoelectronic measurement system, in that these measurement means are means for assembling at least two non-parallel optical fibers which comprise at least three assemblies of at least two optical gages with Bragg gratings, said at least three assemblies being fixed in at least three measurement locations distributed along the tube, connected together and connected to the remote optical cable via optical fibers, and in that at least one assembly further comprises a temperature gage and at least three measurement casings, in which three sensors isolated from the external hydrostatic pressure and connected through tubular connectors are positioned respectively, wherein the remote cable includes a stainless steel tube filled with gel and containing several single mode optical fibers, of a weave of steel wires separated by plastic sheaths.

26. An instrumented tubular device for transporting a pressurized fluid comprising a tube in which this fluid flows, with which are associated means for measuring the main deformations of the tube, and means for measuring the temperature of the fluid in the tube, characterized in that this tube is equipped with measurement means assembled in order to form at least one rosette which forms a two-dimensional flexible sensor, the measurement means integral with a surface and offset by at least one remote optical cable towards an optoelectronic measurement system, in that these measurement means are means for assembling at least two non-parallel optical fibers which comprise at least three assemblies of at least two optical gages with Bragg gratings, said at least three assemblies being fixed in at least three measurement locations distributed along the tube, connected together and connected to the remote optical cable via optical fibers, and in that at least one assembly further comprises a temperature gage and at least three measurement casings, in which three sensors isolated from the external hydrostatic pressure and connected through tubular connectors are positioned respectively, wherein the remote cable includes a stainless steel tube filled with gel and containing several single mode optical fibers, of a weave of steel wires separated by plastic sheaths, wherein the central casing incorporates a base intended for making the connection with the remote optical cable.

27. An instrumented tubular device for transporting a pressurized fluid comprising a tube in which this fluid flows, with which are associated means for measuring the main deformations of the tube, and means for measuring the temperature of the fluid in the tube, characterized in that this tube is equipped with measurement means assembled in order to form at least one rosette which forms a two-dimensional flexible sensor, the measurement means integral with a surface and offset by at least one remote optical cable towards an optoelectronic measurement system, in that these measurement means are means for assembling at least two non-parallel optical fibers which comprise at least three assemblies of at least two optical gages with Bragg gratings, said at least three assemblies being fixed in at least three measurement locations distributed along the tube, connected together and connected to the remote optical cable via optical fibers, and in that at least one assembly further comprises a temperature gage and at least three measurement casings, in which three sensors isolated from the external hydrostatic pressure and connected through tubular connectors are positioned respectively, the device including at least one assembly of three sensors covered with a protective coating, wherein a distribution box provides the connection between the sensors of each assembly and a main optical cable connected to the measurement instrumentation.

* * * * *